US006754257B1

United States Patent
Tsumura

(10) Patent No.: US 6,754,257 B1
(45) Date of Patent: Jun. 22, 2004

(54) FRAME TIMING SYNCHRONIZATION METHOD

(75) Inventor: Soichi Tsumura, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/407,750

(22) Filed: Sep. 28, 1999

(30) Foreign Application Priority Data

Sep. 30, 1998 (JP) .......................................... 10-278152

(51) Int. Cl.[7] .............................................. H04B 1/707
(52) U.S. Cl. ..................................... 375/150; 375/343
(58) Field of Search ................................ 375/150, 152, 375/130, 136, 207, 329, 222, 343, 142, 147, 259; 370/395.53, 335, 336, 485, 441

(56) References Cited

U.S. PATENT DOCUMENTS

| 5,440,597 | A |   | 8/1995  | Chung et al. |         |
|-----------|---|---|---------|--------------|---------|
| 5,655,003 | A | * | 8/1997  | Erving et al. | 379/418 |
| 5,872,808 | A | * | 2/1999  | Davidovici et al. | 375/152 |
| 6,154,487 | A | * | 11/2000 | Murai et al. | 375/150 |

FOREIGN PATENT DOCUMENTS

| FR | 2758031 | 7/1998 |
|----|---------|--------|
| KR | 9516052 | 6/1995 |

OTHER PUBLICATIONS

Bergamo, M.A., "Terminal System and Capability for ARPA–NASA highs–speed SONET/ATM Experiments Over NASA's Advanced Communications Technology Satellite," Military Communications Conference 1993, IEEE Boston, MA (Oct. 11–14, 1993), New York.

European Search Reported dated Jun. 26, 2003.

* cited by examiner

Primary Examiner—Stephen Chin
Assistant Examiner—Ted Wang
(74) Attorney, Agent, or Firm—Dickstein, Shapiro, Morin & Oshinsky, LLP.

(57) ABSTRACT

A frame timing synchronization method of establishing frame synchronization includes the steps of obtaining an integration result, a plurality of number of times, by integrating the square of a complex reception sample from an arbitrary integration start point while shifting an integration range at predetermined intervals, making a search for the maximum integration result from the plurality of integration results, demodulating (despreading) complex reception samples included in a predetermined range having an integration start point as a center corresponding to the maximum integration result while setting the respective samples as demodulation (despreading) start points, and establishing frame synchronization by detecting the portion modulated (spread) by BPSK from the obtained demodulation (despreading) results.

18 Claims, 6 Drawing Sheets

FRAME TIMING SYNCHRONIZATION METHOD

BACKGROUND OF THE INVENTION

1. Field of the Invention

The present invention relates to a frame timing synchronization method of establishing frame synchroization in a CDMA (Code Division Multiple Access) communication system.

2. Description of the Prior Art

In general, communication is performed by using a format predetermined between the transmitting and receiving sides. On the receiving side, to properly receive information, it is necessary to find frame boundaries in a reception signal, i.e., establish frame synchronization.

In a CDMA communication system, which has recently attracted attention, in general, there is a known temporal relationship between a frame boundary and a spreading code. The receiving side cannot decode information without knowing a spreading code and its timing. This makes it more important to establish frame synchronization on the receiving side.

In W-CDMA (Wide band-CDMA) that is being standardized by ARIB (Association of Radio Industries and Businesses), as spreading codes in a forward link, i.e., a channel from a base station to a terminal station, long and short codes are used. The long code is a code having the same period as that of a frame. The short code is a code that has a shorter period than the long code and is used to make the channel have orthogonality with respect to another forward physical channel transmitted from the same base station. A forward link from the base station to the terminal station is spread by the product of long and short codes.

To facilitate establishment of frame synchronization at the terminal station, one of the symbols of a slot is not cyclically spread by a long code but is spread by only a known short code. This symbol spread by only the known short code is called a long code mask symbol. The short code used to spread the long code mask symbol need not be identical to a short code used to spread other symbol portions, and is only required to be known. The terminal station establishes frame synchronization by using this long code mask symbol and the known short code.

In this case, the following procedures are executed to finally establish synchronization with a spreading code.

(1) Despreading is sequentially performed in units of chips by using a known short code. The position of a long code mask symbol is then detected by searching for a start point at which a large correlation value is obtained.

(2) A long code type and frame timing (long code start phase) are detected on the basis of the detected long code mask symbol.

FIG. 7 shows an example of the format of a frame in a forward communication link. Referring to FIG. 7, one frame=N slots, one slot=M symbols, and one symbol=P chips. Only M−1 symbols of one slot are spread by long and short codes, and the remaining one symbol is spread by only a short code. If G types of spreading codes (long codes× short codes) are used as a whole, and the reception oversampling count is S (samples/chip), uncertainty corresponding to G×N×M×P×S must be eliminated to establish frame synchronization. That is, G×N×M×P×S correlation computations are required.

According to the procedures of establishing spreading code synchronization in the prior art, uncertainty is reduced not by Checking all G×N×M×P×S but by checking them stepwise as follows:

$$G \times N \times M \times P \times S \to G \times N \quad (1)$$

$$G \times N \to 1 \quad (2)$$

In practice, in step (2) as well, a frame format is designed to allow the use of a method of eliminating uncertainty stepwise. However, the present invention is not directly associated with this technique, and hence a description thereof will be omitted.

In step (1), however, M×P×S correlation computations are required to result in increases in hardware size and current consumption. In the case of W-CDMA, since N=16, M=10, and P=256, even if S=1, 2,560 correlation computations are required in step (1).

As described above, in the conventional frame timing synchronization method, a large computation amount is required to establish frame timing synchronization.

SUMMARY OF THE INVENTION

The present invention has been made in consideration of the above situation in the prior art, and has as its object to provide a frame timing synchronization method which can reduce the computation amount required to establish frame timing synchronization.

In order to achieve the above object, according to the principal aspect of the present invention, there is provided a frame timing synchronization method of establishing frame synchronization when a reception frame is constituted by a portion modulated (spread) by BPSK (Binary Phase Shift Keying) and a portion modulated (spread) by multilevel PSK (Phase Shift Keying) in which a phase at a signal point after modulation (spreading) exceeds phases at two points, and relative positions of the portion modulated (spread) by BPSK and a portion modulated (spread) by a scheme other than BPSK are known in the reception frame, comprising the steps of:

obtaining an integration result, a plurality of number of times, by integrating the square of a complex reception sample for plural samples period from an arbitrary integration start point while shifting an integration start sample at predetermined intervals;

making a search for a maximum integration result from the plurality of integration results;

demodulating (despreading) complex reception samples included in a predetermined range having an integration start point as a center corresponding to the maximum integration result while setting the respective samples as demodulation (despreading) start points; and establishing frame synchronization by detecting the portion modulated (spread) by BPSK from the obtained demodulation (despreading) results.

As is obvious from the principal aspect, according to the present invention, a one-symbol complex reception sample is squared, and a start point at which the maximum integration result is detected, thereby approximately determining a portion modulated (spread) by BPSK and a portion modulated (spread) by mutlilevel PSK in which the phase at a signal point after modulation (spreading) by QPSK or the like exceeds phases at two points. Frame synchronization is then established by sequentially demodulating (despreading) only an integration result determined as an integration result containing a portion modulated (spread) by BPSK.

The computation amount can therefore be greatly reduced as compared with the prior art in which all reception frames are sequentially demodulated (despread) to establish frame synchronization.

The present invention also has the following auxiliary aspects.

The portion spread by BPSK in the principal aspect is a search channel (SCH) symbol in W-CDMA system that is specified by $3^{rd}$ Generation Partnership Project (3GPP).

Multilevel PSK in the principal aspect is QPSK.

The step of squaring the complex reception sample in the principal aspect is implemented by using a table in which results obtained by squaring complex reception samples are stored in advance.

The principal aspect further comprises the step of repeating, a plurality of times, the step of obtaining an integration result, a plurality of number of times, by squaring and integrating the complex reception sample while shifting an integration range at predetermined intervals, and accumulating a plurality of integration results.

In the present invention, the reliability of an integration result is improved by repeatedly obtaining an integration result and accumulating the resultant values.

The principal aspect further comprises the step of establishing frame synchronization by sequentially demodulating (despreading) a reception frame in units of chips when frame synchronization cannot be established by the step of performing demodulation (despreading) at start points within a predetermined demodulation (despreading) start point range centered on an integration start point at which a maximum integration result is obtained.

Demodulation (despreading) results obtained at start points within a demodulation (despreading) start point range are used in the step of establishing frame synchronization by sequentially demodulating (despreading) a reception frame in units of chips.

As is obvious from the above auxiliary aspects, according to the present invention, when frame synchronization cannot be established, owing to a low C/N (carrier-to-noise) ratio or the like, by demodulation (despreading) at start points within a predetermined demodulation (despreading) start point range centered on an integration start point at which the maximum integration result is obtained, and correlation computations are performed by the conventional frame timing synchronization method, the computation amount can be reduced by using correlation computation results within the demodulation (despreading) start point range in which correlation computations have been performed.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

A few preferred embodiments of the present invention will be described below with reference to the accompanying drawings.

Figure 1:
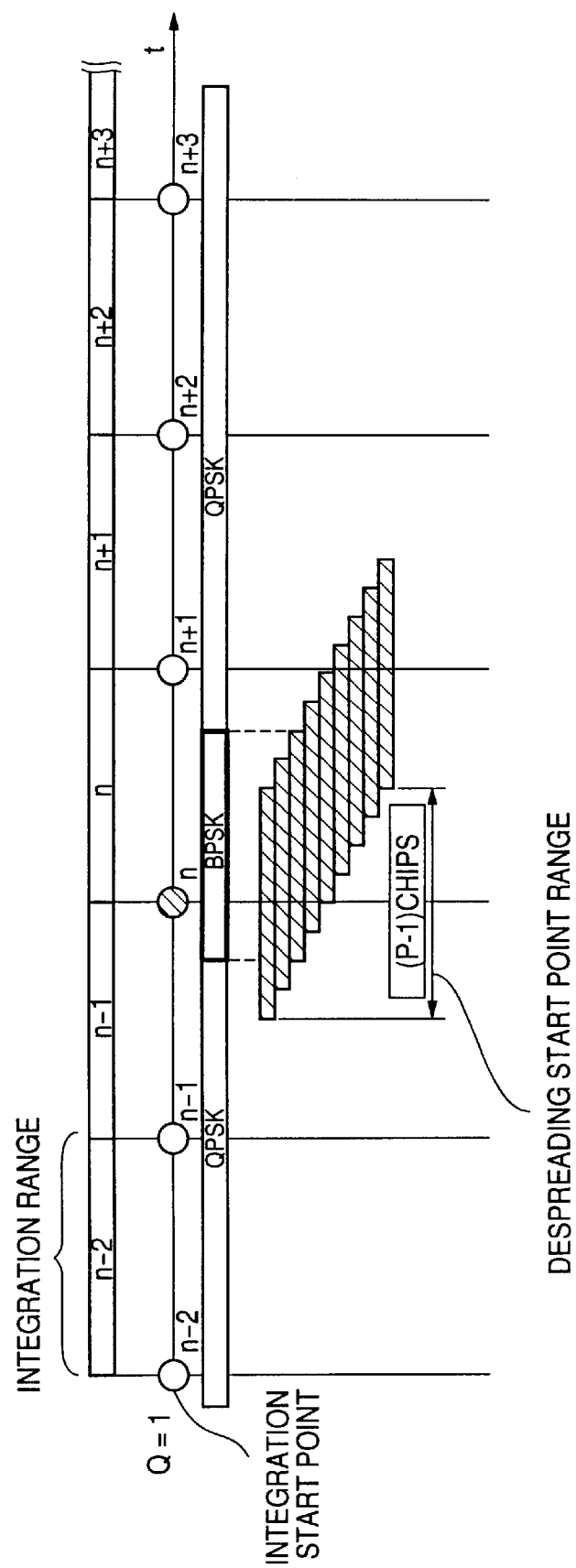
FIG. 1 is a timing chart for explaining a frame timing synchronization method according to the first embodiment of the present invention.

The first embodiment of the present invention will be described first with reference to FIGS. 1 and 2.

In the above W-CDMA, BPSK (Binary Phase shift Keying) is used as a modulation scheme for a spreading code corresponding to a long code mask symbol portion, and an information symbol is fixed. In addition, QPSK (Quadrature Phase Shift keying) is used as a modulation scheme for both a spreading code and information symbol other than a long code symbol.

A frame timing synchronization method of this embodiment will be described below. For the sake of simple description, assume that an oversampling count S (samples/chip) is 1, and a portion spread by BPSK is one symbol.

First of all, the square of a complex reception sample (P chips) corresponding to one symbol is integrated M times consecutively while the integration range is shifted in units of symbols, thereby obtaining M integration results (step 101).

The processing in step 101 will be described with reference to FIG. 1. Each circle represents an integration point, a 1-symbol interval from each integration start point is an integration range. Since the respective integration ranges are shifted from each other by one symbol, the adjacent integration ranges do not overlap, and the respective integration ranges are continuous.

The effect obtained by squaring a reception sample will be described below with reference to FIGS. 3 and 4.

Figure 3:
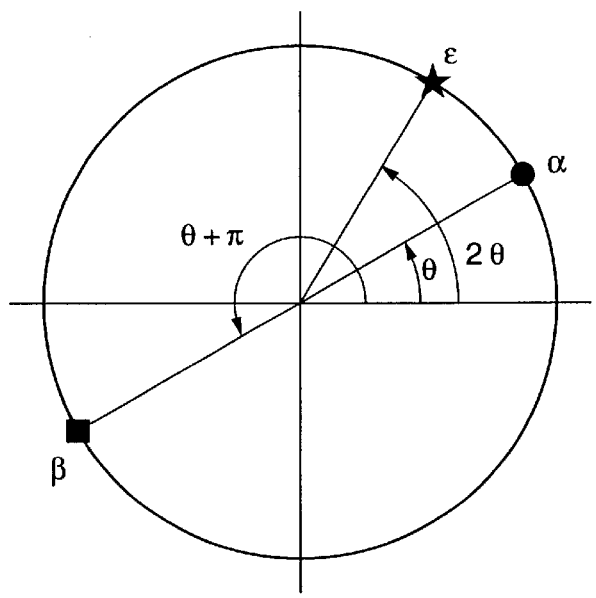
FIG. 3 is a chart for explaining the result obtained by squaring a BPSK complex reception sample.
Figure 4:
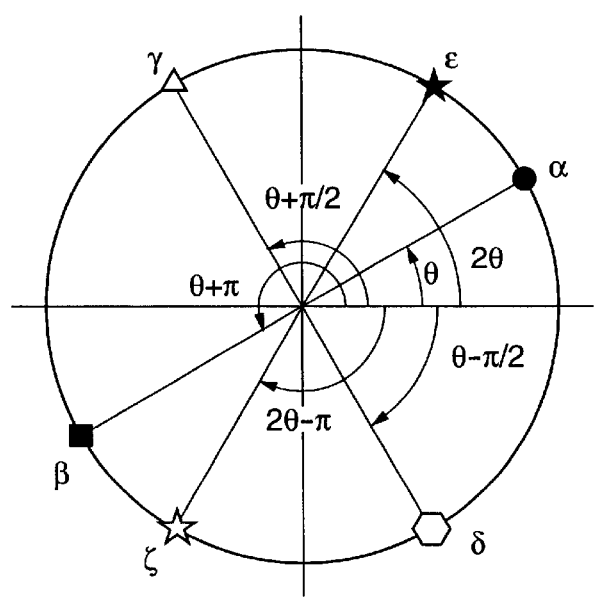
FIG. 4 is a chart for explaining the result obtained by squaring a QPSK complex reception sample.

FIGS. 3 and 4 respectively show phase points of a signal modulated by BPSK and signal points of a signal modulated by QPSK, together with signal points of the squared signal. The amplitude of each signal is normalized to "1".

FIG. 3 shows the case wherein the signal is modulated by BPSK, in which the received signal points are represented by $\alpha$ and $\beta$. The phase at the signal point a is represented by $\theta$. The square of this phase is represented by $2\theta$. The phase at the other signal point $\beta$ is shifted from the phase $\alpha$ by $\pi$, and hence is represented by $\theta+\pi$. The square of this phase is represented by $2(\theta+\pi)$, i.e., $2\theta$.

As described above, in the case of BPSK, when the reception signal is squared, the, resultant phases converge to one point E. Therefore, accumulating them amounts to in-phase addition.

In the case of QPSK shown in FIG. 4, if received signal points $\alpha$ and $\beta$ are present, the result obtained by squaring the phases is represented by $\epsilon$. If received signal points $\gamma$ and $\delta$ are present, the result obtained by squaring the phases is represented by $\zeta$. If the probabilities of all signal points are the same, the probabilities of occurrence of $\epsilon$ and $\zeta$ as the squares of the phases at the signal points are also the same. In this case, since there is a phase difference $\pi$ between $\epsilon$ and $\zeta$, the expected value obtained by accumulating them is 0.

This makes it possible to discriminate a portion modulated by BPSK from a portion modulated by QPSK without actually demodulating them.

Although not described in detail here, when BPSK and QPSK signals coexist, since the correlation between the BPSK and QPSK signals can be expected to be 0, the BPSK portion can be detected by the same processing as described above.

A search is made for the maximum one of the M integration results (step 102). Referring to FIG. 1, the nth circle indicated by hatching is the integration start point at which the maximum integration result is obtained.

A despreading start point range is defined by a total of (P−1)+(2×margin) points corresponding to (P−1)/2+margin portions before and after the integration start point found in step 102, at which the maximum integration result is obtained, and despreading is performed by using a known short code for a long code mask symbol to detect the position of a long code mask symbol (step 103). Referring to FIG. 1, since the margin portion is 0, despreading is performed a total of (P−1) times. FIG. 1 shows that a symbol modulated by BPSK is included in this despreading start point range.

Finally, a long code type and a frame timing (long code start phase) are detected by a method similar to that used in the prior art on the basis of the detected long code mask symbol (step 104).

Uncertainty is reduced by the procedures of establishing spreading code synchronization in this embodiment as follows:

$$G \times N \times M \times P \times S \rightarrow G \times N \times (P/Q-1+(2 \times \text{margin})) \times S: \text{steps } 101 \text{ and } 102 \quad (1)$$

$$G \times N \times (P/Q-1+(2 \times \text{margin})) \times S \rightarrow G \times N: \text{step } 103 \quad (2)$$

$$G \times N \rightarrow 1: \text{step } 104 \quad (3)$$

That is, the procedures in the prior art are executed more stepwise.

Squaring at the signal points in step 101 in this embodiment is expressed as $R^2 = (R_i^2 - R_q^2) + j(2 \times R_i \times R_q)$ provided that the complex reception sample is represented by $R = R_i + jR_q$. This calculation can be implemented by referring to a prepared table. In this case, therefore, only addition is performed as a computation for integration. In addition, maximum value detection in step 104 can be sequentially performed every time an integration result is output, and hence can be regarded as operation that can be performed with a relatively small amount of computation. Assuming that the integration in step 101 in this embodiment is almost equal in computation amount to despreading, the total computation count in the embodiment will be compared with that in the prior art.

According to this embodiment, the total computation count amounts to the sum of a computation count M×Q in procedure (1) and a correlation computation count (P/Q−1+(2×margin)) in procedure (2), as given $$M \times Q + (P/Q-1+(2 \times \text{margin})) \quad (1)$$

In this case, if the margin is 0, the computation count is given by $$M \times Q + P/Q - 1 \quad (2)$$

The minimum computation count in expression (2) is obtained as $2 \times (M \times p)^{1/2} - 1$ when $Q = (P/M)^{1/2}$.

In the prior art, M×P correlation computations are required. As compared with the prior art, therefore, the frame timing method of this embodiment reduces the computation amount required to establish frame timing synchronization to about $2 \times (M \times P)^{1/2}$) under the condition of $(M \times p)^{1/2} \gg 1$. In the case of W-CDMA described above, for example, M=10 and P=256. Therefore, in contrast to a computation count of 100 in the first embodiment, the computation count in the prier art is 2,560. That is, the computation amount in the embodiment is about 3.9% of that in the prior art under the extreme condition with a margin of 0.

A frame timing synchronization method according to the second embodiment of the present invention will be described next with reference to FIGS. 5 and 6.

In the first embodiment, the respective integration ranges in step 101 are shifted from each other by one symbol. However, this integration range shift amount can be set to any constant value. In the second embodiment, the respective integration ranges are shifted from each other by k/Q symbol. In this case, Q is an integer equal to or more than 1, and 0≦k<Q. When Q=1, the shift amount is equal to that in the first embodiment.

Figure 5:
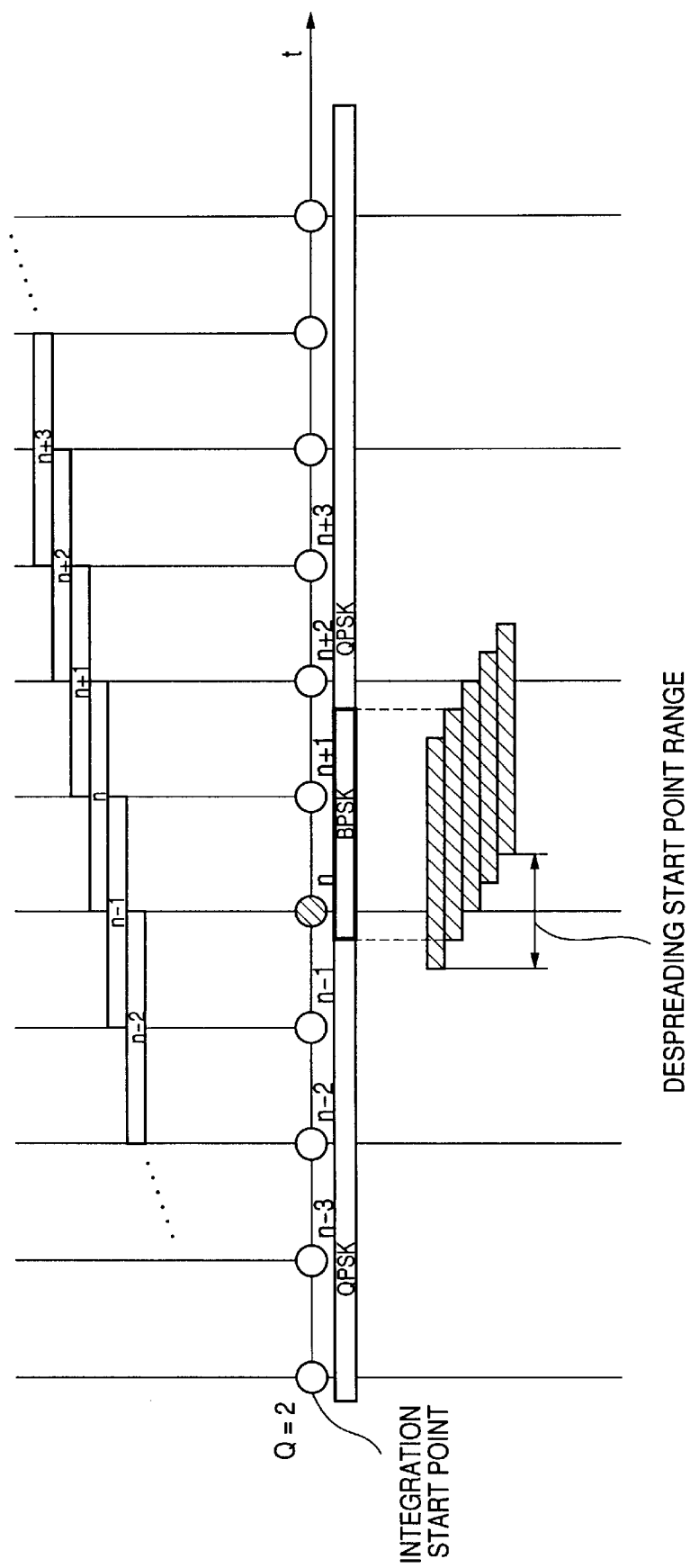
FIG. 5 is a timing chart for explaining a frame timing synchronization method according to the second embodiment of the present invention with Q=2.
Figure 6:
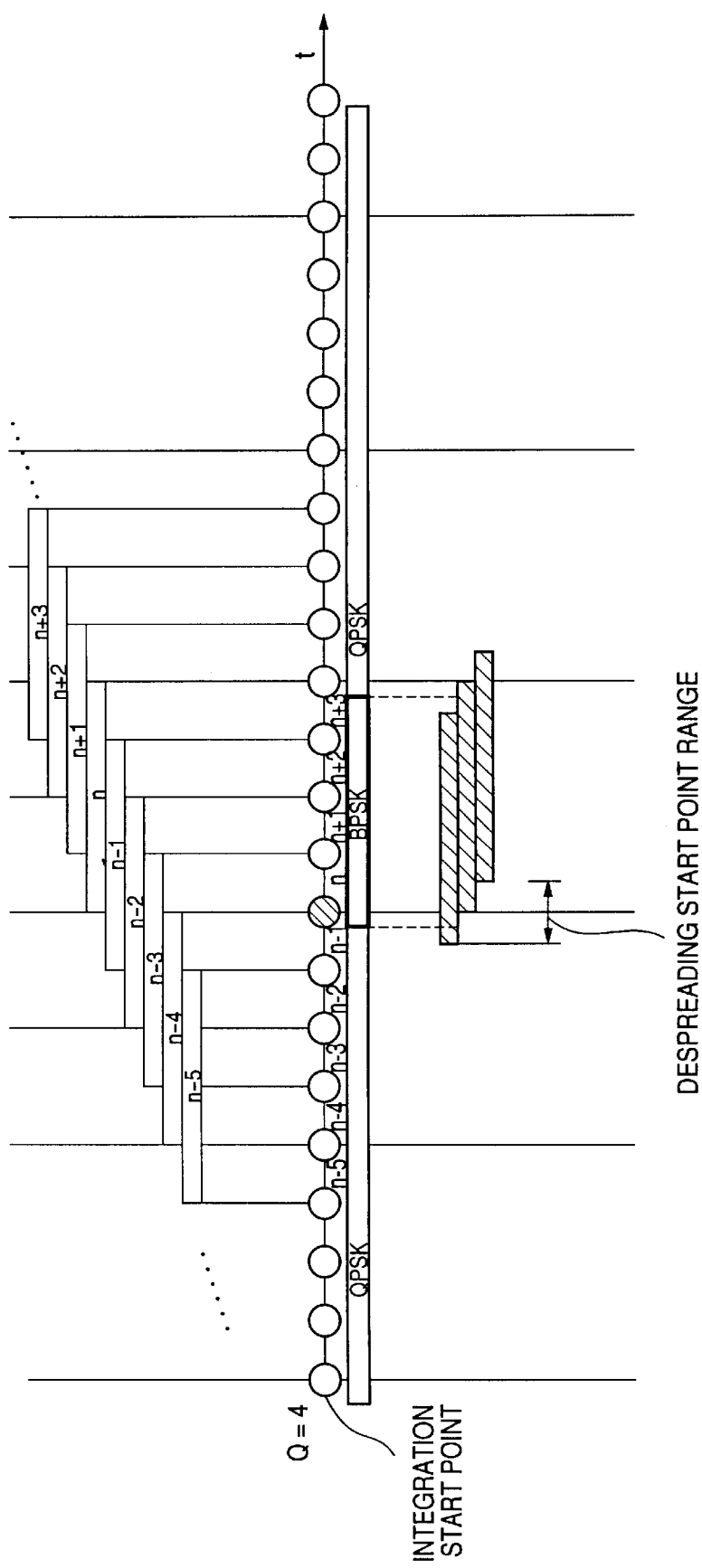
FIG. 6 is a timing chart for explaining the frame timing synchronization method according to the second embodiment of the present invention with Q=4.
Figure 7:
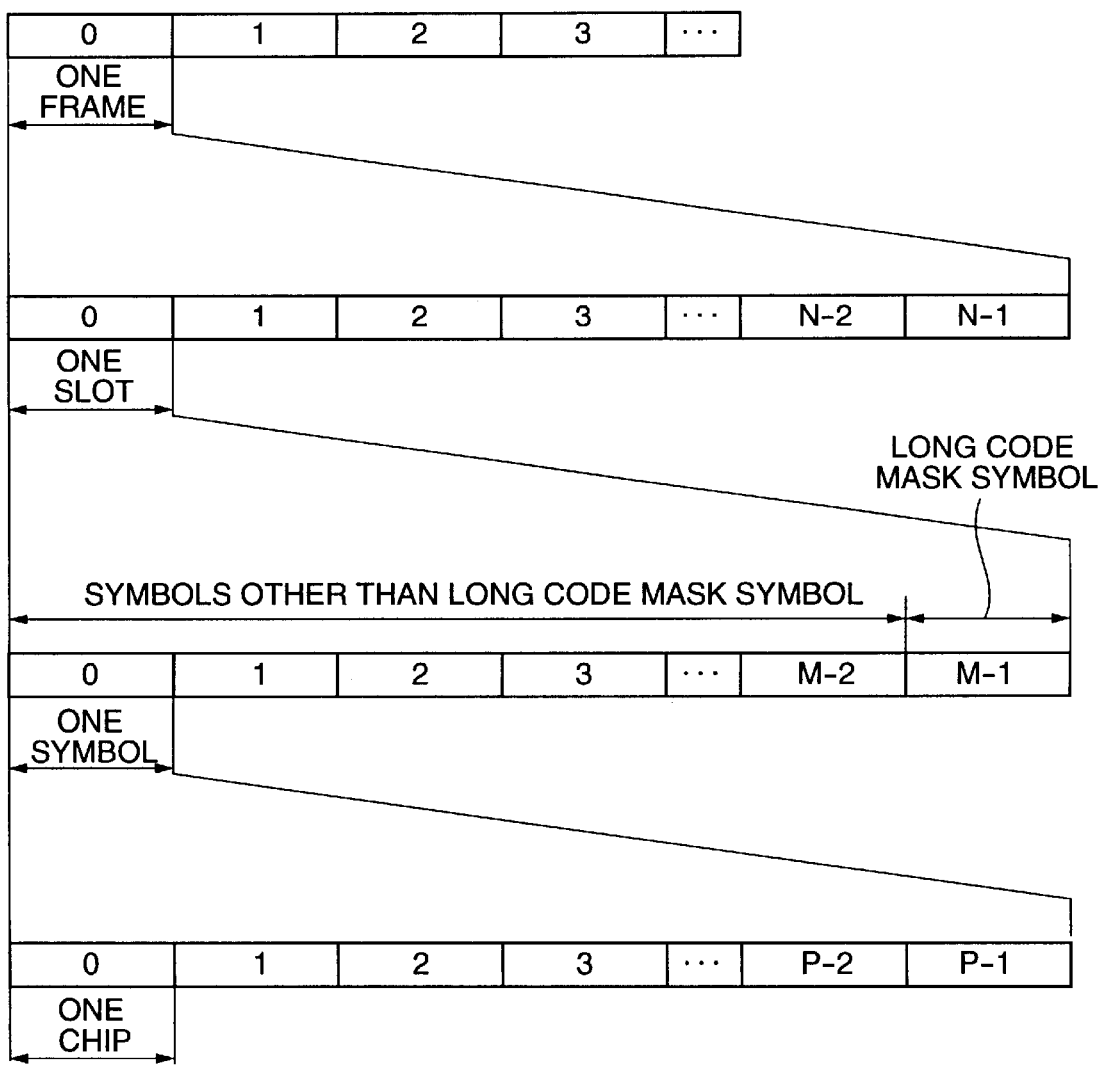
FIG. 7 is a view showing an example of the format of a frame in a forward communication link in a CDMA communication system.

FIG. 5 is a chart for explaining a frame timing synchronization method with Q=2 and k=1. FIG. 6 is a chart for explaining a frame timing synchronization method with Q=4 and k=1.

A procedure to be executed when the respective integration ranges are shifted from each other by k/Q symbol will be described with reference to the flow chart of FIG. 2.

The square of a complex reception sample (P chips) corresponding to one symbol is integrated M×Q/k times consecutively while the integration range is shifted in units of symbols, thereby obtaining M×Q/k integration results (step 101). For the sake of simple explanation, assume that k=1.

A search is made for the maximum one of the M×Q integration results (step 102).

A total of (P/Q−1)+(2×margin) points corresponding to (P/Q−1)/2+margin portions before and after the integration start point found in step 102, at which the maximum integration result is obtained, are set as despreading start points, and despreading is performed by using a know short code for a long mask symbol, thereby detecting the position of a long code symbol. Referring to FIG. 1, since the margin is 0 with Q=2 and Q=4, despreading is performed (P/2−1) times and (P/4−1) times in the respective cases.

A long code type and frame timing (long code start phase) are detected on the basis of the detected long code symbol by the same method as in the prior art (step 104).

To establish frame synchronization by the methods described in the first and second embodiments, a reception C/N higher than that used for frame synchronization by the conventional frame timing synchronization is required. If, therefore, the reception C/N is low, frame synchronization may not be established by the frame timing synchronization methods of the first and second embodiments. Even in this case, frame timing synchronization may be established by the conventional frame timing synchronization method. For this reason, if frame synchronization cannot be established by the frame timing synchronization methods of the first and second embodiments, frame synchronization may be established by the conventional frame timing synchronization method. In addition, in this case, if the correlation computation result obtained by the procedure described with reference to step 104 in FIG. 2 is used for frame synchronization establishing processing by the conventional frame timing synchronization method, the computation amount can be reduced.

Figure 2:
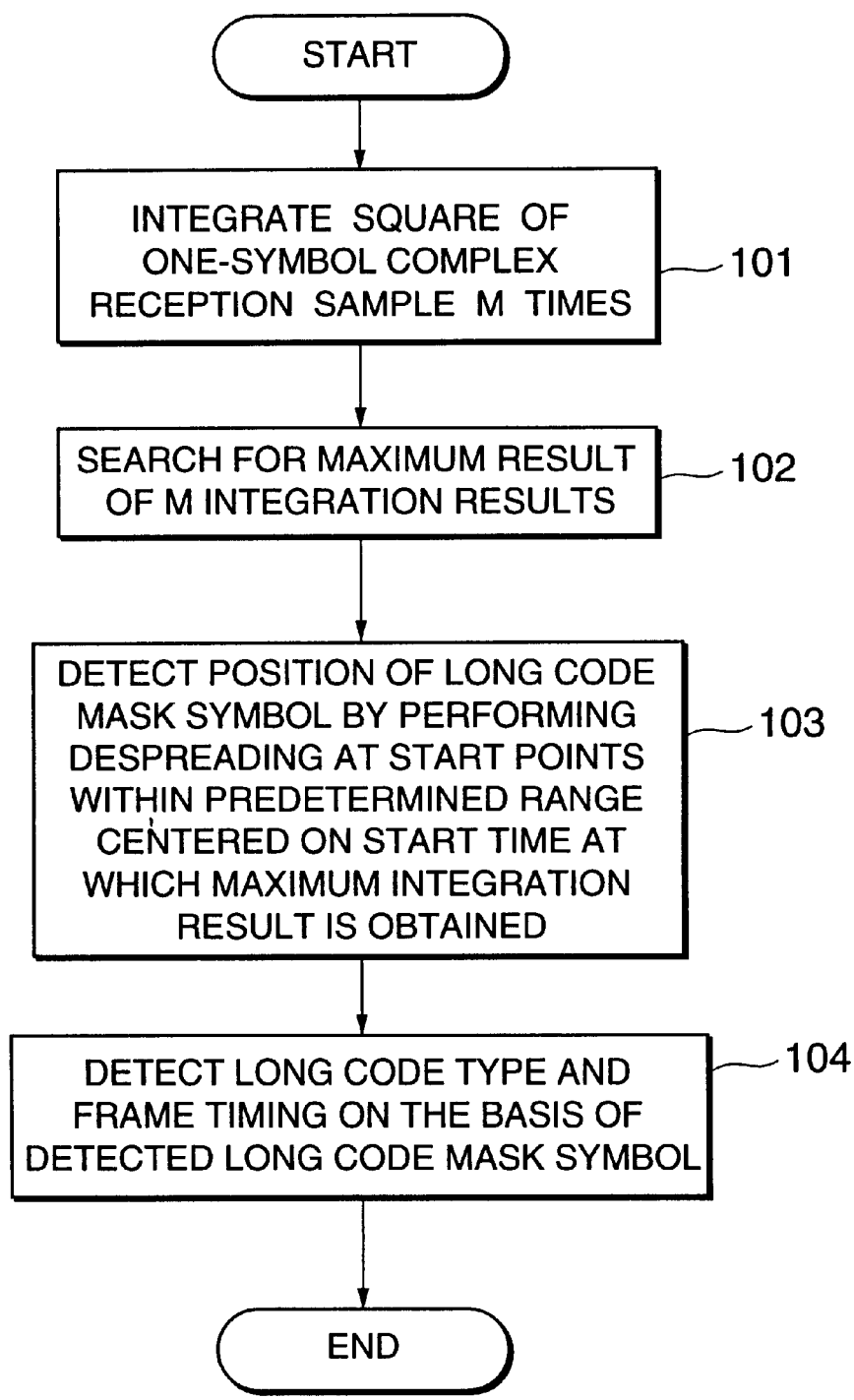
FIG. 2 is a flow chart showing a procedure for the frame timing synchronization method according to the first embodiment.

In the first and second embodiments, the M×Q integration results may be accumulated by executing the procedure in step 101 in FIG. 2 a plurality of number of times. This makes it possible to increase the reliability of each integration result.

In the first and second embodiments, the present invention is applied to the CDMA communication systems using a spread spectrum scheme. However, the present invention is not limited to this. For example, the present invention can be applied to other communication schemes, such as TDMA and FDMA, in which frame synchronization must be established.

What is claimed is:

1. A frame timing synchronization method of establishing frame synchronization when a reception frame has a portion modulated by BPSK and a portion modulated by multilevel PSK in which a phase at a signal point after modulation exceeds phases at two points, and relative positions of the portion modulated by BPSK and a portion modulated by a scheme other than BPSK are known in the reception frame, comprising the steps of:

obtaining an integration result a plurality of times, by integrating the square of a complex reception sample for a plurality of sample periods from an arbitrary integration start point while shifting an integration start sample at predetermined intervals;

searching for a maximum integration result from the plurality of integration results;

demodulating complex reception samples included in a predetermined range having an integration start point as a center corresponding to the maximum integration result while setting the respective samples as demodulation start points; and establishing frame synchronization by detecting the portion modulated by BPSK from the obtained demodulation results.

2. For a direct sequence spread spectrum system, a frame timing synchronization method of establishing frame synchronization when a reception frame is constituted by a portion spread by BPSK and a portion spread by multilevel PSK in which a phase at a signal point after modulation with spread spectrum system exceeds phases at two points, and relative positions of the portion spread by BPSK and a portion spread by a scheme other than BPSK are known in the reception frame, comprising the steps of:

obtaining an integration result a plurality of times by integrating the square of a complex reception sample for at least one period from an arbitrary integration start point while shifting an integration start sample at predetermined intervals;

making a search for a maximum integration result from the plurality of integration results;

despreading complex reception samples included in a predetermined range having an integration start point as a center corresponding to the maximum integration result while setting the respective samples as despreading start points; and establishing frame synchronization by detecting the portion spread by BPSK from the obtained despreading results.

3. A method according to claim 2, wherein the portion spread by BPSK is a search channel (SCH) symbol in W-CDMA system that is specified by $3^{rd}$ Generation Partnership Project (3GPP).

4. A method according to claim 1, wherein the multilevel PSK is QPSK.

5. A method according to claim 2, wherein the multilevel PSK is QPSK.

6. A method according to claim 3, wherein the multilevel PSK is QPSK.

7. A method according to claim 1, wherein the step of squaring the one-symbol complex reception sample is implemented by using a table in which results obtained by squaring complex reception samples are stored in advance.

8. A method according to claim 2, wherein the step of squaring the one-symbol complex reception sample is implemented by using a table in which results obtained by squaring complex reception samples are stored in advance.

9. A method according to claim 3, wherein the step of squaring the one-symbol complex reception sample is implemented by using a table in which results obtained by squaring complex reception samples are stored in advance.

10. A method according to claim 1, further comprising the step of repeating, a plurality of number of times, the step of obtaining an integration result, a plurality of times, by squaring and integrating the one-symbol complex reception sample while shifting an integration range at predetermined intervals, and accumulating a plurality of integration results.

11. A method according to claim 2, further comprising the step of repeating a plurality of times the step of obtaining an integration result a plurality of times by squaring and integrating the one-symbol complex reception sample while shifting an integration range at predetermined intervals and accumulating a plurality of integration results.

12. A method according to claim 3, further comprising the step of repeating a plurality of times the step of obtaining an integration result, by squaring and integrating the one-symbol complex reception sample while shifting an integration range at predetermined intervals and accumulating a plurality of integration results.

13. A method according to claim 1, further comprising the step of establishing frame synchronization by sequentially demodulating a reception frame in units of chips when frame synchronization cannot be established by the step of performing demodulation at start points within a predetermined demodulation start point range centered on an integration start point at which a maximum integration result is obtained.

14. A method according to claim 13, further comprising the step of using demodulation results obtained at start points within a demodulation start point range in the step of establishing frame synchronization by sequentially demodulating a reception frame in units of chips.

15. A method according to claim 2, further comprising the step of establishing frame synchronization by sequentially despreading a reception frame in units of chips when frame synchronization cannot be established by the step of performing despreading at start points within a predetermined despreading start point range centered on an integration start point at which a maximum integration result is obtained.

16. A method according to claim 3, further comprising the step of establishing frame synchronization by sequentially despreading a reception frame in units of chips when frame synchronization cannot be established by the step of performing despreading at start points within a predetermined despreading start point range centered on an integration start point at which a maximum integration result is obtained.

17. A method according to claim 15, further comprising the step of using despreading results obtained at start points within a despreading start point range in the step of establishing frame synchronization by sequentially despreading a reception frame in units of chips.

18. A method according to claim 16, further comprising the step of using despreading results obtained at start points within a despreading start point range in the step of establishing frame synchronization by sequentially despreading a reception frame in units of chips.

* * * * *